US006201469B1

(12) United States Patent
Balch et al.

(10) Patent No.: US 6,201,469 B1
(45) Date of Patent: Mar. 13, 2001

(54) WIRELESS SYNCHRONIZATION OF PULSED MAGNETIC EAS SYSTEMS

(75) Inventors: Brent F. Balch, Fort Lauderdale, FL (US); William R. Accolla, Andover; John A. Allen, Methuen, both of MA (US); James A. Cook, Boynton Beach, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 0 days.

(21) Appl. No.: 09/250,064

(22) Filed: Feb. 12, 1999

(51) Int. Cl.[7] .......... H04Q 5/22

(52) U.S. Cl. .......... 340/10.1; 340/572.1; 340/572.4; 340/572.8

(58) Field of Search .......... 340/825.14, 825.21, 340/825.2, 10.1, 10.2, 825.54, 572, 572.4, 572.1, 572.8; 455/41, 502, 503

(56) References Cited

U.S. PATENT DOCUMENTS 4,622,543 11/1986 Anderson, III et al. .
4,658,241 4/1987 Torre .
4,675,658 6/1987 Anderson et al. .
5,023,600 6/1991 Szklany et al. .
5,608,765 * 3/1997 Tanoue .......... 375/365

* cited by examiner

*Primary Examiner*—Brian Zimmerman
*Assistant Examiner*—Yves Dalencourt
(74) *Attorney, Agent, or Firm*—Akerman Senterfitt

(57) ABSTRACT

A method for wireless synchronization of a first and second magnetic electronic article surveillance (EAS) systems arranged for operation in close proximity to one another. The method includes the steps of programming each of the first and second EAS systems for transmitting at least one unique signal into a partially overlapping interrogation zone of the EAS systems and for receiving any signals from the interrogation zones at respective and predetermined transmit and receive phases relative to a common reference. The first EAS system transmits at least one unique signal containing phase information which is received and identified at the second EAS system during one of its receiver phases as the one unique signal. The second EAS system uses the conveyed phase information received to transmit synchronously with transmissions from the first EAS system.

23 Claims, 6 Drawing Sheets

TX = TRANSMITTER WINDOW
RX = RECEIVER WINDOW
A B C = PHASE DESIGNATION

WIRELESS SYNCHRONIZATION OF PULSED MAGNETIC EAS SYSTEMS

BACKGROUND OF THE INVENTION

1. Field of the Invention

This invention relates to the field of operating multiple magnetic electronic article surveillance (EAS) systems, and in particular to wireless synchronization of such multiple EAS systems without wires, cables, fiber optic links and the like between individual ones of the multiple EAS systems.

2. Description of Related Art

Pulsed magnetic EAS systems, for example, operate by generating a short burst of magnetic flux in the vicinity of a transmitter antenna. This pulsed field stimulates a particular type of magnetic label or marker, whose characteristics are such that it is resonant at the operating frequency of the system. The marker absorbs energy from the field and begins to vibrate at the transmitter frequency. This is known as the marker's forced response. When the transmitter stops abruptly, the marker continues to ring down at a frequency which is at, or very near the system's operating frequency. This ring down frequency is known as the marker's natural frequency. The vicinity of the transmitter antenna in which the response can be forced is the interrogation zone of the EAS system.

The magnetic marker is constructed such that when the marker rings down, the marker produces a weak magnetic field, alternating at the marker's natural frequency. The EAS system's receiver antenna, which may be located either within its own enclosure or within the same enclosure as the transmitter antenna, receives the marker's ring down signal. The EAS system processes the marker's unique signature to distinguish the marker from other electromagnetic sources and/or noise which may also be present in the interrogation zone. A validation process must therefore be initiated and completed before an alarm sequence can be reliably generated to indicate the marker's presence within the interrogation zone.

The validation process is time-critical. The transmitter and receiver gating must occur in sequence and at predictable times. Typically, the gating sequence starts with the transmitter burst starting with a synchronizing source, such as the local power line's zero crossing. The receiver window opens at some predetermined time after the same zero crossing. Problems arise when the transmitter and receiver are not connected to the same power source. In a three phase power system, power lines within a building can have individual zero crossings at 0°, 120° or 240° with respect to each other.

Some noise sources are synchronous with the local power line. Televisions, monitors, cathode ray tube in other devices, electric motors, motor controllers and lamp dimmers, for example, all generate various forms of line synchronous noise. As a result, no one time window can be guaranteed to be suitable for detecting markers. Accordingly, pulsed magnetic EAS receivers typically examine three time windows to scan for the presence of magnetic markers, as illustrated in FIG. 4. With a 60 Hz power line frequency, for example, the first window occurs nominally 2 milliseconds (msec) after the receiver's local positive zero crossing; by convention, referred to as phase A. The second receiver window, referred to as phase B, occurs 7.55 msec after the local zero crossing; being determined by adding one-third of the line frequency period and 2 msec. The third receiver window, referred to as phase C, occurs 13.1 msec after the local zero crossing; being determined by adding two-thirds of the line frequency period and 2 msec. At 50 Hz power line frequencies, the timing is analogous. Each receiver window begins a nominal 2 msec after either the 0°, 120° or 240° point in the line frequency's period. In this way, even if a first EAS system, referred to as system A, is connected to a different phase of the power line than a nearby EAS system, referred to as system B, the transmitted signal of system B will not directly interfere with the receiver of system A.

In order to compare received signals to background noise, separate noise averages are continuously sampled, computed and stored as part of a signal processing algorithm. This is commonly done by operating the EAS systems at 1.5 times the power line frequency, 90 Hz for a 60 Hz line frequency or 75 Hz for a 50 Hz line frequency, and alternating the interpretation of each successive phase. More particularly, if phase A is a transmit phase (the receiver window is preceded by a transmitter burst), phase B will be a noise check phase (the receiver window was not preceded by a transmitter burst), phase C will be a transmit phase, phase A will be a noise check phase, and so on.

Even if the EAS systems synchronize to their respective zero crossings, independent pulsed magnetic EAS systems operating adjacent or in close proximity to each other can have a degrading influence on each other. Assume, for example, a situation wherein two independent EAS systems are installed in close proximity to each other, but connected to different legs of the power line. One system transmits in phase A and the other system transmits in phase B, with respect to the first system. If a valid marker is located between the antennas of these two independent systems, the phase A system will sense the ring down response in the phase A receiver window. In phase B, the second system transmits and stimulates the marker into another ring down response. The first system did not transmit and is expecting a lower level noise response in its phase B window. Instead the first system detects the ring down response from the marker, without having previously transmitted, and exits its validation sequence, deciding on the basis of its programming that the detected signals must have been noise. Likewise, the second system detects the marker in the window following phase B and enters a validation sequence. In phase C, when the second system expects the marker signal to be absent, the marker is stimulated by the first system, which is again transmitting in phase C. The second system senses the ring down signal in its phase C window, when it did not transmit, decides the detected signal must have been noise in accordance with the programming, and exits its validation sequence. Thus, two systems in close proximity which are not phase synchronized can inhibit each other. The phrase close proximity is used herein as for denoting when two or more EAS systems, for example pulsed EAS systems, are close enough to interfere with one another if not synchronized in one fashion or another.

Previous implementations of pulsed magnetic EAS systems, for example those available from Sensormatic Corporation, have utilized two approaches to synchronization. One approach is manual, fixed phase operation at the power line frequency. According to this approach, a system installer determines the quietest phase and sets the system to expect marker signals only in that phase. This can be effective, but relies on the assumption that the quietest phase will always remain the quietest phase. In fact, many noise sources are not so constant and the system's performance can vary throughout the day and from day to day. A second approach is hard wired operation, either at the power line frequency or at 1.5 times the line frequency, wherein all EAS systems operating in close proximity are wired together. One EAS system is designated the master and a synchronizing signal is sent over wires, cables or optical fibers to ensure that subordinate or slave EAS systems all operate in phase with the master. This method is also effective, but requires connection of some form of control cable between respective system processor boards of the multiple EAS systems. Such connections can be inconvenient and can add significant cost if, for example, the installation requires routing the cable under the floor.

Pulsed EAS systems can incorporate special features, such as frequency-hopping or operating at two slightly different frequencies to improve detection of markers with a broader manufacturing tolerance for center frequency. Phase flipping, wherein the two coils which constitute the system's transmitter antenna alternately reverse their phase relationship between aiding (0°; also referred to as in-phase) and figure-8 (180°; also referred to as substantially out-of-phase) operation. This technique improves overall detection of magnetic markers throughout the system's interrogation field, since locations and marker orientations which would cause signal nulls when the transmitter coils were in the aiding mode, for instance, will be absent in the figure-8 mode and vice versa.

If an EAS system is operating at 1.5 times the line frequency, for example, it is not automatically known which line phase to operate in when the system is first powered up and completes its self-test routines. It is important to have adjacent transmitters operating in the same phase, that is A, B or C, for two reasons. The first reason is that the transmitter fields can aid each other, improving stimulation of magnetic markers within the interrogation zones of both systems. The second reason is that if two adjacent EAS systems are operating out-of-step and a marker initiates a validation sequence in a first EAS system, a second, adjacent EAS system will stimulate the marker in what would be one of the first system's noise windows, which would force the first EAS system out of the validation sequence, reducing overall performance.

SUMMARY OF THE INVENTION

The inventive arrangements taught herein enable wireless synchronization of multiple EAS systems operating in close proximity to one another. The inventive arrangements are particularly useful for improving the operation of adjacent pulsed magnetic EAS systems, for example those transmitting at a rate of 1.5 times the power line frequency, without the additional inconvenience and expense of a synchronizing cable. In this regard, adjacent EAS systems are in close proximity.

In order to most effectively respond to the broadest range of markers, whose frequency characteristics are only approximately known; whose orientation when passing through the system's detection zone is unknown and whose time and rate of passage are also unknown, the pulsed EAS system must proceed through a sequence of operating modes, in turn operating each local or remote antenna assembly; operating its transmitter antennas in both aiding and figure-8 phasing; operating each local or remote receiver antenna assembly in the optimal phase relationship for the best compromise between marker response consistent with lowest ambient noise pickup; operating sequentially at a plurality of similar operating frequencies; and, operating at each of three time windows.

Moreover, the pulsed EAS system must not only be capable of performing all of the above sequential operations, but capable of advantageously interrupting the sequence upon first detection of a possible marker response, and holding the current conditions static until such time that the condition of a valid marker within said system's detection zone can be either confirmed or rejected. Under conditions of a successful marker validation sequence, or an unsuccessful marker validation sequence, sequential stepping through the remainder of possible operating conditions must resume.

It can be appreciated that, with so many operational parameters to be varied, many logical decisions must be made in order to test all possible combinations. The variation of the operational parameters together with numerous maintenance or housekeeping operations place a heavy processing burden upon the system's central processor. A very efficient way to guarantee all parametric variations are met is to utilize a sequencing table, often contained within the system's processing software, but which could also be implemented in hardware, for example through some form of programmable logic.

In utilizing a sequencing table, each of the required operating parametric modes is assigned a binary status: for example on or off; enabled or disabled; or the like. Each parameter is mapped to a unique position within a binary word or characteristic sequence of ones and zeroes. Each desired system condition, containing the status of each operating parameter, can be described by one of these binary words. The total of all desired system operating conditions are typically stored as a block in memory. A pointer variable, or index, is used by the processing means to keep track of the currently active location within the sequence. Thus, the system's processor is relieved of the burden of making individual decisions regarding the proper status of all the parametric variables. The processor, through its associated operational software, only has to determine the appropriate position within the sequencing table, and the binary word at the location contains the instructions affecting the status of each operational parameter. A further advantage of this approach is that, upon first detecting a possible marker response, the processor may freeze the current status of each operational parameter by merely re-using the same binary instruction repetitively, throughout the resulting validation sequence, until either the signal is rejected or an alarm signal is generated. If the processor continues to increment the pointer variable or index at a constant rate, then, when it leaves the aforementioned validation sequence, it may resume standard scanning, in-step and synchronously with adjacent similar systems, by continuing its sequence at the current location of the index.

System operation is therefore programmed in the form of a sequence table as described above, which controls the precise structure of which phases are transmit phases and which are noise phases, when to operate at the upper hop frequency and when to operate at the lower hop frequency, when to transmit in the phase-aiding mode and when to transmit in figure-8 mode. A noise phase is a receive phase not preceded by a transmitter burst, wherein the receiver scans the environment for all background signals. In short, each system operates within a tightly defined structure, and all systems operate according to the same sequence table.

Three approaches to wireless synchronization of multiple EAS systems operating in close proximity have been developed and are designated herein as: continuous synchronization; discontinuous passive synchronization; and, discontinuous active synchronization. An inventive aspect common to each of these approaches is a utilization of the transmitter and receiver of each adjacent EAS system to communicate synchronizing messages or information between adjacent multiple EAS systems.

In accordance with the continuous synchronization approach, an EAS a system does not immediately begin transmitting at power-up, but first activates its receiver at reduced gain, and moves its receiver window timing to coincide with a normal transmit window. The system can now examine the receiver output and determine if any other EAS systems are already operating in close proximity. If no other systems are detected in the area, the EAS system microprocessor assumes it is a master system and, restoring window timing to normal, begins transmitting, starting in phase A after the next power line zero crossing. If another system is detected within the area, the receiver window timing is first restored to normal. Then, the microprocessor advances the receiver window timing gradually, reducing the time delay between the end of transmission and the beginning of a normal receiver window, until the receiver just begins to detect the adjacent transmitter field. The microprocessor can now determine which phase the nearby EAS system is operating in at any instant and thereby begin transmitting in step with the adjacent system. If the adjacent EAS system is also phase flipping, alternating the phase of its transmitter field between in-phase aiding and out-of-phase figure-8, the microprocessor can also sense this because two very different signal levels will be detected coming from the other EAS system. The microprocessor can then also begin transmitting in phase or out-of-phase along with the other EAS system.

In accordance with the discontinuous passive synchronization approach, a unique, periodic synchronization signal is employed, such as the cessation of transmission for two full power line cycles. The EAS systems run through a strictly defined sequence of modes and conditions called an operating sequence for a predetermined time and then the systems stop transmitting, also for a predetermined time, then they repeat. When an EAS system finishes its power up self-test, it reduces the receiver gain and advances its receiver window timing to coincide with a normal transmit window, as in the previous approach. The system can now examine the receiver output and determine if any other EAS systems are already operating in the area.

If no other systems are detected in the area, the system assumes it is a master system and, restoring window timing to normal, begins transmitting in phase A after the next zero crossing. If another system is detected within the area, the microprocessor senses the synchronizing interval represented by the absence of transmissions, and after observing through several synchronizing intervals to preclude errors due to noise and interference, restores normal receiver gain and timing and begins transmitting, starting in phase A after the next zero crossing after the end of the next synchronizing interval.

Since, in this approach, the operational sequence is precisely defined for all similar EAS systems, there is no need to perform separate tests for phase flipping, frequency hopping, off frequency deactivated marker checks and the like. All similar EAS systems within close proximity of each other, for example approximately 10 feet, will automatically synchronize with one another after power up. If the EAS systems are separated by a greater distance, it makes no difference whether they synchronize with one another because their fields will not interact.

There are certain circumstances, for example a general power interruption, after which all adjacent EAS systems will be powering up simultaneously. Systems that coincidentally power up at precisely the same instant of time and that are connected to the same leg of the power line will both assume a master mode of operation and begin at the same phase. Systems which are either not connected to the same leg of the power line or, due to component differences, start at slightly different times, may complete their scanning phase without sensing a nearby master and falsely assume the master role.

In accordance with a first method for overcoming this problem, a variable delay based on a pseudo random number is included in the software of each system to decrease the likelihood of simultaneous starts. In accordance with a second method for overcoming this problem, each system's software branches to a subroutine at pre-defined intervals, wherein checks are made to confirm that its local synchronizing interval coincides with that of nearby systems. If so, the EAS system continues uninterrupted. If not, then the synchronizing sequence described immediately above is repeated. Thus, the concept of master is transitory, and an EAS system which may have started up as a master drops this role and becomes subordinate to the ruling majority of other EAS systems the first time one of these running status checks is undertaken. All systems within close proximity to each other will become synchronized within a few minutes of power restoration.

The discontinuous active synchronization approach utilizes the ability of an EAS system to transmit frequencies other than the marker's natural frequency and to alter system timing, allowing the transmitter burst to occur at instants of time other than during transmitter windows. The alternate frequencies can be used individually as unique messages or can be combined serially to form messages. This approach uses distributed control and there is no permanent master EAS system. This approach can also rely on the ability of the EAS system to measure signal amplitude as an additional criterion.

The transmission of an active signal at a particular frequency is interpreted as a synchronizing burst, or message, when detected by other adjacent and similarly programmed EAS systems. Upon detecting this unique synchronizing burst, adjacent EAS systems adjust their operating position in their predefined operating sequence to match that of the signaling system. After each EAS system adjusts its own operating sequence to match that of the signaling EAS system, each system detecting a synchronizing burst will itself transmit a synchronizing burst during the same time frame as the first signaling system, for example for a period of five seconds, after which the EAS system will stop transmitting the synchronizing burst. In this manner, a synchronizing message or command is passed on to adjacent EAS systems which may have been out of range with respect to the first signaling EAS system, but may not be out of range with respect to the second signaling EAS system.

It is useful to periodically affirm that the EAS systems are synchronized. In accordance with one method, a synchronizing burst can be transmitted on a random basis, for example after a marker is detected and an alarm occurs. This proves to be both random and infrequent.

A method in accordance with an inventive arrangement for wireless synchronization of first and second magnetic electronic article surveillance (EAS) systems arranged for operation in close proximity to one another, comprises the steps of: programming each of the first and second EAS systems for transmitting at least one unique signal into respective and partially overlapping interrogation zones of the first and second EAS systems and for receiving any signals from the interrogation zones at respective and predetermined transmit and receive phases relative to a common reference; transmitting a unique signal from the first EAS system; receiving and identifying the at least one unique signal at the second EAS system during one of its receiver phases; recognizing phase information conveyed by the at least one unique signal; and, transmitting from the second EAS system synchronously with the transmitting from the first EAS system, responsive to the conveyed phase information.

The method can comprise one or more of the following steps: gradually reducing a phase delay between the at least one unique signal and initiation of a normal receiver phase, until the at least one unique signal is just detected; generating the at least one unique signal at a frequency known to force a response from a magnetic marker in any one of the interrogation zones; conveying the phase information in the at least one unique signal by periodically interrupting the transmitting of the at least one unique signal; and/or, conveying the phase information in the at least one unique signal by generating the at least one unique signal at a predetermined frequency.

The at least one unique signal can advantageously be identified both by correspondence with the predetermined frequency and by a minimum signal amplitude.

The method can also comprise one or more of the following steps: conveying phase information and conveying information representative of certain events occurring during operating the first EAS system by selectively generating one of a plurality of unique signals; modifying operation of the second EAS system responsive to the selectively generated and identified ones of the plurality of unique signals; temporarily inhibiting signal transmitting from the second EAS system during a marker validation sequence in the first EAS system; testing the wireless synchronization of the first and second EAS systems after each instance of detecting a valid marker in any one of the interrogation zones, and if the first and second EAS systems are found not to be synchronized by the testing, resynchronizing the first and second EAS systems; and/or testing the wireless synchronization only during a predetermined receive phase.

A wireless arrangement of multiple magnetic electronic article surveillance (EAS) systems in accordance with another inventive arrangement comprises: first and second magnetic EAS systems positioned for operation in such close proximity to one another that the first and second EAS systems have respective interrogation zones which partially overlap one another; the first and second EAS systems having respective antenna assemblies; the first and second EAS systems having respective transmitter circuits coupled to the respective antenna assemblies for generating at least one unique signal in the respective interrogation zones; the first and second EAS systems having respective receiver circuits coupled to the antenna assemblies for capturing signals from the respective interrogation zones; the first and second EAS systems having respective controllers programmed with a common set of instructions for initiating and terminating transmission of the at least one unique signal and for receiving any signals from the respective interrogation zones at respective transmit and receive phases, determined by the instructions and relative to a common reference; the controller in the first EAS system initiating transmission of the at least one unique signal from the first EAS system, the at least one unique signal conveying phase information; and, the controller in the second EAS system initiating reception of signals from the respective interrogation zone during one of its receive phases, and in response to receiving and identifying the at least one unique signal transmitted by the first EAS system, the controller in the second EAS system modifying operation of the second EAS system responsive to the phase information conveyed in the at least one unique signal to synchronize operation of the second EAS system with operation of the first EAS system.

In an alternative embodiment, the controller in the second EAS system can gradually reduce a phase delay between the at least one unique signal and initiation of a normal receiver phase, until the at least one unique signal is just detected.

The at least one unique signal has a frequency known to force a response from a magnetic marker in any one of the interrogation zones.

A periodic interruption of the at least one unique signal, referred to as a sync interval, can convey the phase information. Alternatively, a predetermined frequency, referred to as a sync burst, of the at least one unique signal can convey the phase information.

The controller can identify the at least one unique signal by correspondence with the predetermined frequency and by a minimum signal amplitude.

The controller can initiate selective generation of one of a plurality of unique signals for conveying information representative of certain events occurring during operation of the first EAS system. The controller in the second EAS system can modify operation of the second EAS system responsive to the selectively generated and identified ones of the plurality of unique signals. The controller of the second EAS system can temporarily inhibit signal transmitting from the second EAS system during a marker validation sequence in the first EAS system.

The respective controllers of the first and second EAS systems can initiate testing of the wireless synchronization after each instance of detecting a valid marker in the respective interrogation zone. The controller can initiate the testing of the wireless synchronization only during a predetermined receive phase. The controller resynchronizes the first and second EAS systems if the first and second EAS systems are found not to be synchronized by the testing.

DETAILED DESCRIPTION OF THE PREFERRED EMBODIMENTS

Figure 1:
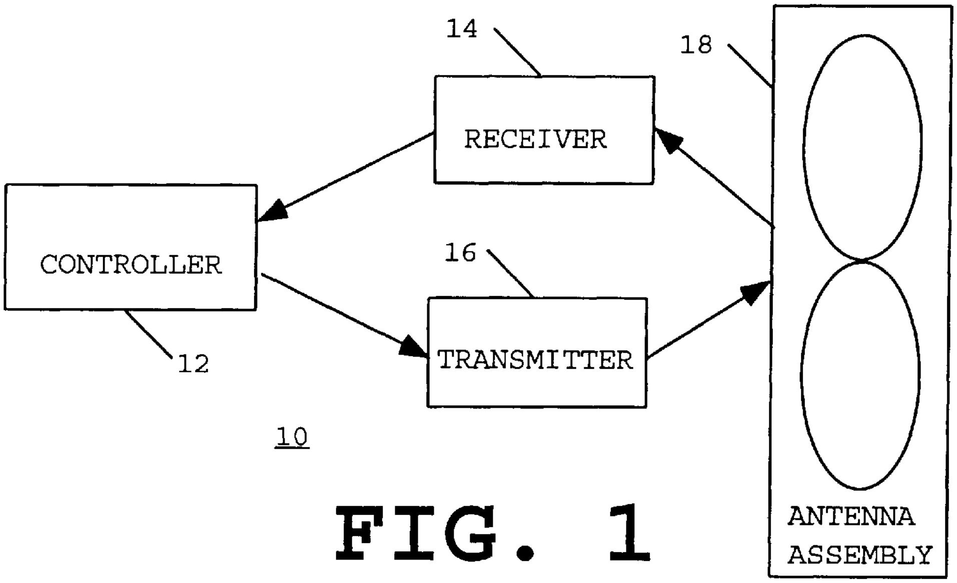
FIG. 1 is a basic block diagram of a representative EAS system.

FIG. 1 is a high level block diagram of a representative EAS system 10. An electronic controller circuit 12, which can include a microprocessor, is connected to both a receiver circuit 14 and a transmitter circuit 16. The receiver and transmitter circuits are connected to an antenna assembly 18. Signals from a receiving antenna are amplified, filtered and detected by the receiver circuit 14, which supplies both amplitude and frequency information to the controller 12. Based on design constraints, which may include program instructions in firmware, the controller has the ability to transmit signals of various frequencies, at particular times and for particular durations to the system's environment through a transmitter means connected to a transmitting antenna.

The antenna assembly 18 can comprise one or more coils serving as the receiving antenna and one or more coils serving as the transmitting antenna. Alternatively, the antenna assembly can comprise one or more coils, serving as both the receiving and transmitting antennas.

In accordance with an inventive arrangement, a first method for wireless synchronization that can be implemented with EAS system 10 is continuous wireless synchronization. An EAS system does not immediately begin transmitting at power-up, but first activates its receiver at reduced gain, and moves its receiver window timing to coincide with a normal transmit window. The system can now examine the receiver output and determine if any other EAS systems are already operating in close proximity. If no other systems are detected in the area, the EAS system microprocessor assumes it is a master system and, restoring window timing to normal, begins transmitting, starting in phase A after the next power line zero crossing. If another system is detected within the area, the receiver window timing is first restored to normal. Then, the microprocessor advances the receiver window timing gradually, reducing the time delay between the end of transmission and the beginning of a normal receiver window, until the receiver just begins to detect the adjacent transmitter field. The microprocessor can now determine which phase the nearby EAS system is operating in at any instant and thereby begin transmitting in step with the adjacent system. If the adjacent EAS system is also phase flipping, alternating the phase of its transmitter field between in-phase aiding and out-of-phase figure-8, the microprocessor can also sense this because two very different signal levels will be detected coming from the other EAS system. The microprocessor can then also begin transmitting in phase or out-of-phase along with the other EAS system.

In accordance with a further inventive arrangement, a second method for wireless synchronization that can be implemented with EAS system 10 is wireless discontinuous passive synchronization. A unique, periodic synchronization signal is employed, such as the cessation of transmission for two full power line cycles. The EAS systems run through a strictly defined sequence of modes and conditions called an operating sequence for a predetermined time and then the systems stop transmitting, also for a predetermined time, then they repeat. When an EAS system finishes its power up self-test, the EAS system reduces the receiver gain and advances the EAS system's receiver window timing to coincide with a normal transmit window, as in the previous approach. The EAS system can now examine the receiver output and determine if any other EAS systems are already operating in the area.

If no other systems are detected in the area, the system assumes it is a master system and, restoring window timing to normal, begins transmitting in phase A after the next zero crossing. If another system is detected within the area, the microprocessor senses the synchronizing interval represented by the absence of transmissions, and after observing through several synchronizing intervals to preclude errors due to noise and interference, restores normal receiver gain and timing and begins transmitting, starting in phase A after the next zero crossing after the end of the next synchronizing interval.

The operational sequence is precisely defined for all similar EAS systems. Accordingly, there is no need to perform separate tests for phase flipping, frequency hopping, off frequency deactivated marker checks and the like. All similar EAS systems within close proximity of each other, for example approximately 10 feet, will automatically synchronize with one another after power up. If the EAS systems are separated by a greater distance, it makes no difference whether they synchronize with one another because their fields will not interact.

However, there are certain circumstances after which all adjacent EAS systems will be powering up simultaneously, for example a general power interruption. EAS systems that coincidentally power up at precisely the same instant of time and that are connected to the same leg of the power line will both assume a master mode of operation and begin at the same phase. EAS systems which are either not connected to the same leg of the power line or, due to component differences, start at slightly different times, may complete their scanning phase without sensing a nearby master and falsely assume the master role.

In accordance with a first method for overcoming this problem, a variable delay based on a pseudo random number is included in the software of each system to decrease the likelihood of simultaneous starts. In accordance with a second method for overcoming this problem, each system's software branches to a subroutine at pre-defined intervals, wherein checks are made to confirm that its local synchronizing interval coincides with that of nearby systems. If so, the EAS system continues uninterrupted. If not, then the synchronizing sequence described immediately above is repeated. Thus, the concept of master is transitory, and an EAS system which may have started up as a master drops this role and becomes subordinate to the ruling majority of other EAS systems the first time one of these running status checks is undertaken. All systems within close proximity to each other will become synchronized within a few minutes of power restoration.

In accordance with a another inventive arrangement, a third method for wireless synchronization that can be implemented with EAS system 10 is wireless discontinuous active synchronization. The discontinuous active synchronization approach utilizes the ability of an EAS system to transmit frequencies other than the marker's natural frequency and to alter system timing, allowing the transmitter burst to occur at instants of time other than during transmitter windows. The alternate frequencies can be used individually as unique messages or can be combined serially to form messages. This approach uses distributed control and there is no permanent master EAS system. This approach can also rely on the ability of the EAS system to measure signal amplitude as an additional criterion.

The transmission of an active signal at a particular frequency is interpreted as a synchronizing burst, or message, when detected by other adjacent and similarly programmed EAS systems. Upon detecting this unique synchronizing burst, adjacent EAS systems adjust their operating position in their predefined operating sequence to match that of the signaling system. After each EAS system adjusts its own operating sequence to match that of the signaling EAS system, each system detecting a synchronizing burst will itself transmit a synchronizing burst during the same time frame as the first signaling system, for example for a period of five seconds, after which the EAS system will stop transmitting the synchronizing burst. In this manner, a synchronizing message or command is passed on to adjacent EAS systems which may have been out of range with respect to the first signaling EAS system, but may not be out of range with respect to the second signaling EAS system.

Pulsed EAS systems according to the inventive arrangements, and with which the inventive arrangements can be utilized, are capable of undertaking a large number of different operations as may be necessary to monitor and detect markers, synchronize their operation, validate markers and generate alarm conditions. A number of examples emphasize the difficulties in controlling such systems. A pulsed EAS system can be connected to an antenna assembly comprising two or more antenna coils for establishing system transmitting fields, and the same antenna coils, or possibly two or more antenna coils, for receiving signals from possible markers within the system's transmitting field. A pulsed EAS system can be capable of operating such transmitter antenna coils independently, such that the coils may be driven either in the in-phase or out-of-phase condition, whereby the resultant magnetic flux can be oriented in different directions, optimal for stimulating a magnetic marker of unknown orientation. A pulsed EAS system can be capable of operating the receiver antenna coils selectively in a phase aiding, phase opposed (figure-8), or intermediate phase relationship with respect to each other, independent of the phase characteristics of the transmitter antenna coils, for the dual purpose of optimal marker signal detection and ambient noise rejection. A pulsed EAS system can be capable of operating at a plurality of similar operating frequencies, in sequence, to provide the benefit of narrower system bandwidth for lower detection of ambient noise, combined with improved response to a broader range of marker frequencies. A pulsed EAS system can be capable of operating, sequentially, both a local antenna assembly, as well as a remote antenna assembly, in order to physically extend the detection zone of the system. A pulsed EAS system can be capable of operating the transmitter antenna coils and the receiver antenna coils, such that they are active only during selected times is during a period of the local power line frequency, wherein some intervals consist of a period of active transmission, followed by a period of reception, to scan for potential markers within the system's detection zone, and other intervals consist of a period of reception only, to assess the state of local ambient noise. A pulsed EAS system can be capable of operating the transmitter antenna coils and the receiver antenna coils at three distinct time windows during the period of the local power line frequency. These time windows can be mutually separated by 120 degrees of phase, to preclude the chance of unsatisfactory performance due to line-synchronous noise sources.

Figure 8:
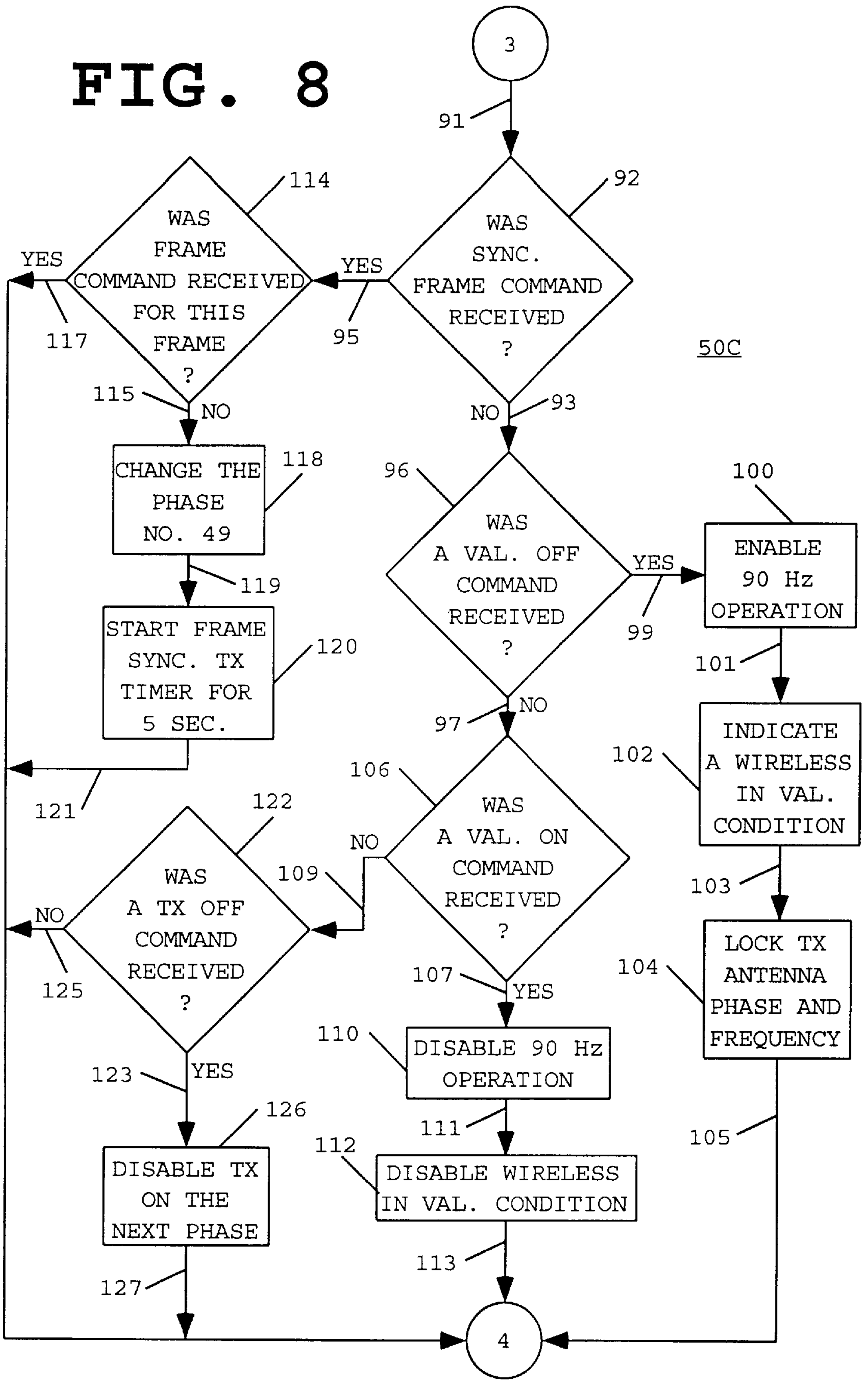

In order to most effectively respond to the broadest range of markers, whose frequency characteristics are only approximately known; whose orientation when passing through the system's detection zone is unknown and whose time and rate of passage are also unknown, the pulsed EAS system must proceed through a sequence of operating modes, in turn operating each local or remote antenna assembly; operating its transmitter antennas in both aiding and figure-8 phasing; operating each local or remote receiver antenna assembly in the optimal phase relationship for the best compromise between marker response consistent with lowest ambient noise pickup; operating sequentially at a plurality of similar operating frequencies; and, operating at each of three time windows.

Moreover, the pulsed EAS system must not only be capable of performing all of the above sequential operations, but capable of advantageously interrupting the sequence upon first detection of a possible marker response, and holding the current conditions static until such time that the condition of a valid marker within said system's detection zone can be either confirmed or rejected. Under conditions of a successful marker validation sequence, or an unsuccessful marker validation sequence, sequential stepping through the remainder of possible operating conditions must resume.

It can be appreciated that, with so many operational parameters to be varied, many logical decisions must be made in order to test all possible combinations. The variation of the operational parameters together with numerous maintenance or housekeeping operations place a heavy processing burden upon the system's central processor. A very efficient way to guarantee all parametric variations are met is to utilize a sequencing table, often contained within the system's processing software, but which could also be implemented in hardware, for example through some form of programmable logic.

In utilizing a sequencing table, each of the required operating parametric modes is assigned a binary status: for example on or off; enabled or disabled; or the like. Each parameter is mapped to a unique position within a binary word or characteristic sequence of ones and zeroes. Each desired system condition, containing the status of each operating parameter, can be described by one of these binary words. The total of all desired system operating conditions are typically stored as a block in memory. A pointer variable, or index, is used by the processing means to keep track of the currently active location within the sequence. Thus, the system's processor is relieved of the burden of making individual decisions regarding the proper status of all the parametric variables. The processor, through its associated operational software, only has to determine the appropriate position within the sequencing table, and the binary word at the location contains the instructions affecting the status of each operational parameter. A further advantage of this approach is that, upon first detecting a possible marker response, the processor may freeze the current status of each operational parameter by merely re-using the same binary instruction repetitively, throughout the resulting validation sequence, until either the signal is rejected or an alarm signal is generated. If the processor continues to increment the pointer variable or index at a constant rate, then, when it leaves the aforementioned validation sequence, it may resume standard scanning, in-step and synchronously with adjacent similar systems, by continuing its sequence at the current location of the index.

Figure 5:
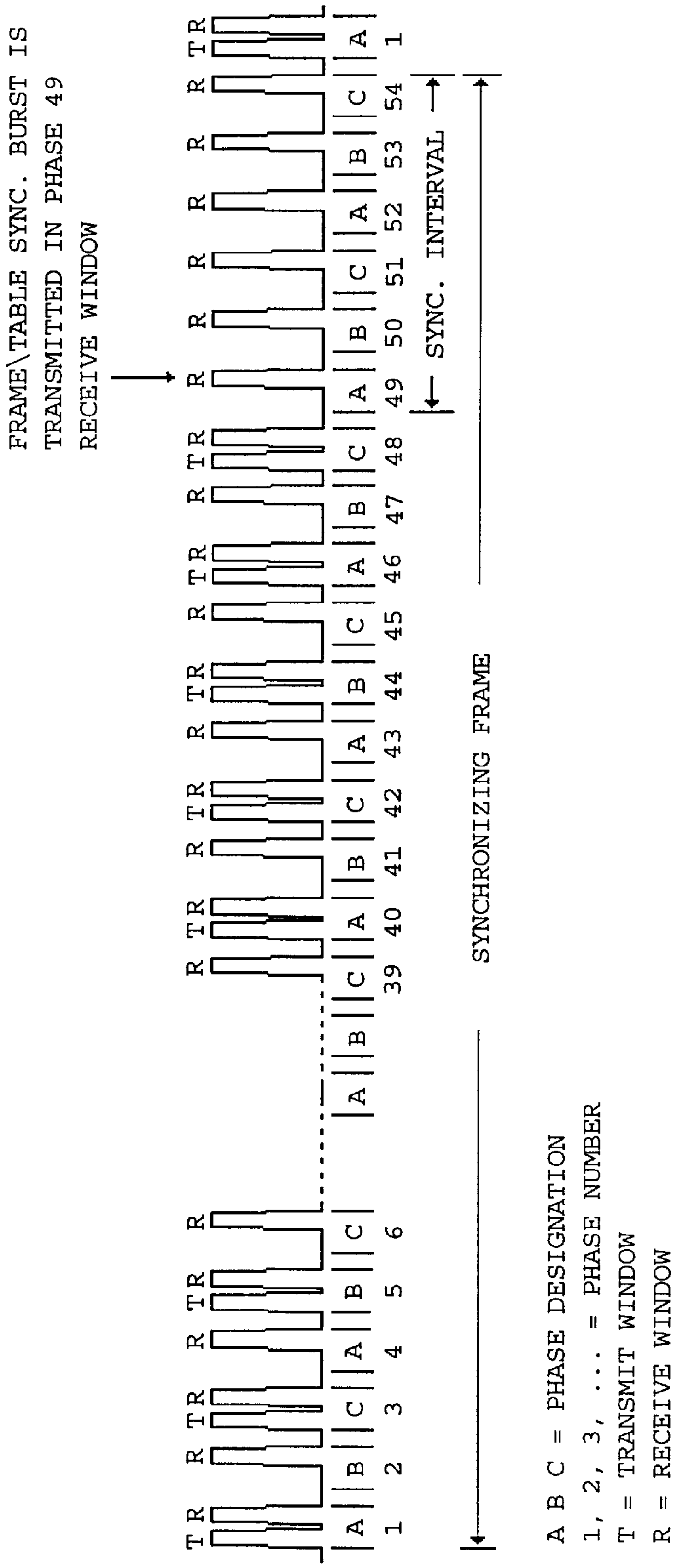
FIG. 5 is a timing diagram useful for explaining synchronizing frames in accordance with the inventive arrangements.

Consider an EAS system operating with a center frequency of 58.0 kHz. Upon power-up, and after performing confidence tests and initialization, the system deviates from the standard timing sequence and transmits a frequency other than the marker's natural frequency during a particular receiver phase in a sequence table, as described above. The timing is then restored to normal operation. The frequency of this synchronizing burst is denoted $f_{sync}$ and the duration of this synchronizing burst is 1.6 msec. Just as the sequence table is known to each system, so is the phase in which $f_{sync}$ is to occur. In the presently preferred embodiment, as shown in FIG. 5, the synchronizing burst is transmitted in the receive window of phase 49 of the synchronizing frame and the frequency is 56.6 kHz. The $f_{sync}$ signal may be transmitted every time it reaches the particular phase in the sequence table for as long as the system is powered, or it may be limited to a finite interval. In order to avoid unnecessarily raising the noise average seen by the other adjacent EAS systems, the synchronizing bursts are only transmitted for five seconds in the presently preferred embodiment.

When the $f_{sync}$ signal is received and decoded by an adjacent EAS system, that EAS system immediately adjusts the pointer in its own sequence table accordingly, so the adjacent EAS system will be synchronized with the EAS system transmitting the synchronizing burst. The adjacent EAS system decodes the $f_{sync}$ signal by first comparing the incoming signal amplitude to a reference value. The transmitting system is aligned with the receiver window, and accordingly, the amplitude reference value must be much higher than that of a marker or most ambient noise. In the presently preferred embodiment, the minimum amplitude threshold used is six volts. Secondly, the adjacent EAS system compares the frequency to predefined ranges for the various wireless messages. The adjacent EAS system will not accept another synchronization message until it has sequenced through the table long enough to send it's own synchronization message for the five second interval. This insures that a system does not encounter a conflict by receiving an $f_{sync}$ signal from two other systems that are out of range from each other, but not to the third system. The synchronization can then ripple to all EAS systems within range.

It is advantageous to periodically affirm that the EAS systems are synchronized. In accordance with one method, a synchronizing burst can be transmitted on a random basis, for example after a marker is detected and an alarm occurs. This proves to be both random and infrequent.

Other detection events can be also synchronized. Two examples of such detection events are validation and forced-transmitter-off. When an EAS system detects an in-band signal of sufficient amplitude in a receive window, the EAS system begins a validation sequence to determine whether the signal is from a valid marker. In the event the EAS system is phase flipping or frequency hopping, the validation sequence locks the transmitter configuration to the mode which resulted in the marker first being detected, as the frequency and/or phase of that mode is deemed to represent the best mode for continued detection of the marker. An EAS system that detects an apparent marker notifies adjacent EAS systems by transmitting a signal at a frequency other than the markers' natural frequency in the next receive window. In the presently preferred embodiment, the frequency used for this message is 56.8 kHz.

Conversely, when the detecting EAS system terminates a validation sequence, the system can transmit to the second system in a receive window at a frequency other than the markers' natural frequency. In the presently preferred embodiment, the frequency used for this message is 57.0 kHz.

There is also a mechanism for ensuring that EAS systems receiving the validation message will not stay in that mode if the validation termination message is missed. The validation message is terminated every time the table sequence reaches the particular phase that is assigned as the table synchronization phase.

Another part of a validation sequence advantageously requires that the EAS system perform a forced-transmitter-off-check in the initial phase the marker was detected. In this case, the validation sequence overrides the normal table sequence. More particularly, the table may normally indicate a transmit phase, but validation requires a noise phase. This is a forced-transmitter-off-check. In order to keep an adjacent EAS system from transmitting at this time, a frequency other than the markers' natural frequency is transmitted in the receive window of the prior phase. The receiving system will then perform a forced-transmitter-off-check as requested. In the presently preferred embodiment, the frequency used for this message is 57.2 kHz.

Discontinuous active synchronization uses the transmission of an active signal, at a particular frequency, to act as a synchronizing burst when detected by other adjacent and similar EAS systems. Upon detecting this unique synchronizing burst, the adjacent EAS systems adjust their own operating position in their predefined operating sequence to match that of the signaling EAS system. After each EAS system adjusts its own operating sequence to match that of the signaling EAS system, each EAS system detecting the synchronizing burst will itself transmit a synchronizing burst during the same time frame as the first signaling system, for a period of five seconds, after which transmission of the synchronizing burst terminates. In this way, the synchronizing command gets passed on to other adjacent systems which may have been out of range with respect to the first signaling EAS system, but may not be out of range with respect to the second signaling EAS system.

Figure 2:
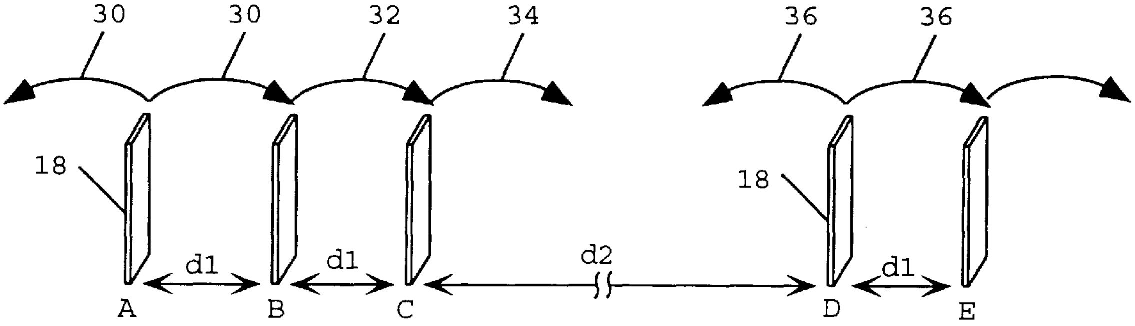
FIG. 2 illustrates a typical multiple EAS system installation in accordance with the inventive arrangements.

FIG. 2 illustrates a typical multiple EAS system installation in accordance with the inventive arrangements and the presently preferred embodiment. The figure depicts antenna assemblies 18 from several independent EAS systems. Three of the systems, labeled A, B and C are each separated by a distance no greater than a limiting distance d1. Two systems, labeled D and E, are also mutually separated by a distance no greater than the limiting distance d1. Systems C and D are separated by a distance d2, which is greater than the limiting distance d1. Each of these independent systems follows the same predefined pattern of transmission and reception intervals, including various permutations of transmission frequency and antenna phase. This sequence is referred to alternately as a standard timing sequence or a synchronizing frame, as shown in FIG. 5.

With reference to FIG. 5, a synchronizing frame comprises 54 phases. Phases 1 through 48 define various transmit and receive windows. Phase A, for example, includes a transmit window T and a receive window R. Phase 2 includes only a receive window. Phases 49 through 54 are defined as a synchronizing interval. Synchronizing bursts are transmitted, when appropriate, in the receive window of phase 49.

It is important to understand that two independent EAS systems, separated by a distance equal to or less than limiting distance d1, generate electromagnetic fields which, if they are not synchronized, can adversely interact with each other, causing reduced system sensitivity or other undesired operation. Two independent systems, separated by a distance greater than limiting distance d1, generate electromagnetic fields which will be too weak to have any significant effect on each other, regardless of whether or not they are synchronized.

In FIG. 2, systems A through E are initially unsynchronized. System A has just completed its power-up self-diagnostic checks. The first action undertaken by system A, as it operation begins, is to initiate transmitting synchronizing bursts indicated by the curved arrows 30, in phase 49 of the standard timing sequence. Transmission of the synchronizing bursts continues for a period of 5 seconds. EAS system B, which is within the field of influence of EAS system A, detects a synchronizing burst 30 in one of its normal receiver timing windows. Within which one of the receiver timing windows the synchronizing burst is detected is undetermined, because the systems are not yet synchronized. EAS system C, which is outside the field of influence of EAS system A, likely will not detect the synchronizing burst 30 from EAS system A. Upon detecting a synchronizing burst from EAS system A, EAS system B shifts its sequence pointer in software such that the next phase will be phase 50, which is now synchronized with EAS system A, and for the next 5 seconds, EAS system B begins transmitting synchronizing bursts 32, starting with the next occurrence of phase 49. EAS system C is within the field of influence of EAS system B, so when EAS system C detects the synchronizing bursts from EAS system B, EAS system C shifts its sequence pointer in software such that the next phase will be phase 50, thus synchronizing with EAS systems A and B, and for the next 5 seconds, EAS system C also begins transmitting synchronizing bursts 34. EAS system D is beyond the field of influence of EAS system C, so EAS system D is free to operate without regard to the actions of systems A, B or C. EAS system D can and will communicate with system E, which is within range of synchronizing bursts 36.

In summary, after completing a power-up self test, each EAS system transmits a synchronizing burst in phase 49 of the synchronizing frame for a period of 5 seconds, after which phase 49 is again treated as a noise check window. Any other EAS system detecting a synchronizing burst in any window of its local synchronizing frame will immediately switch its frame pointer in software such that the subsequent window will be phase 50.

In order to ensure that EAS systems do not accidentally lose synchronization throughout the day, any time a system successfully detects a marker within its field and generates a system alarm event, the detecting EAS system can be programmed to transmit a synchronizing burst in phase 49 for 5 seconds. Adjacent EAS systems, separated by a distance no greater than limiting distance d1, will detect the burst in phase 49 if they are still synchronized, and so the adjacent EAS systems will not adjust their timing. If any adjacent EAS system detects this synchronizing burst in any receiver phase but phase 49, that EAS system will adjust its software pointer to synchronize with the first system, and the resynchronized EAS system will begin transmitting synchronizing bursts for 5 seconds. In this way, the synchronization cascades out from an initiating system to all other systems which are within limiting distance d1 of at least one other system.

Figure 3:
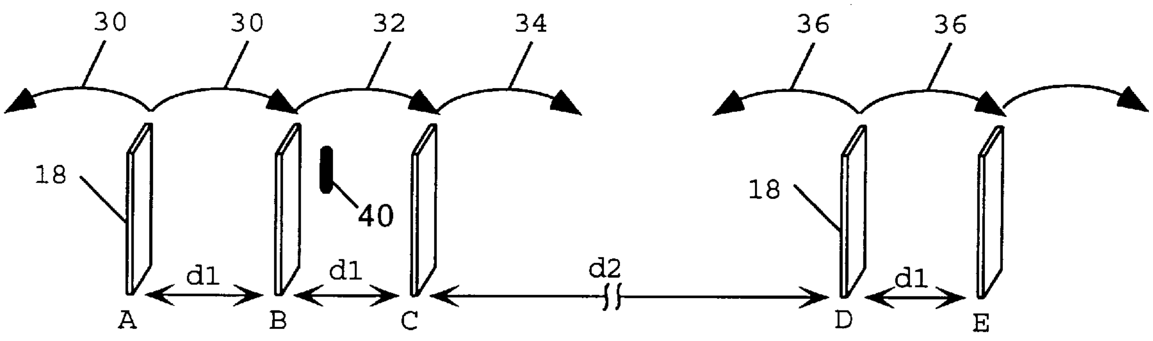
FIG. 3 is useful for explaining the operation of the multiple EAS systems shown in FIG. 2 when a marker or tag is present.
Figure 4:
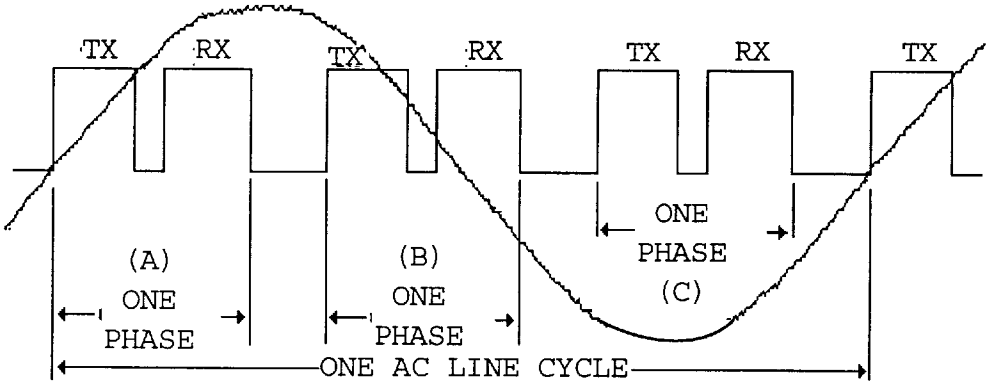
FIG. 4 is a timing diagram useful for explaining the manner in which phases of operation are determined with respect to power line zero crossings.

In addition to synchronizing adjacent systems such that their transmission bursts occur at the same times, so that they supplement each other, it is sometimes advantageous to communicate additional information between systems. For instance, when a tag or marker 40 enters the magnetic field of an EAS system, for example EAS system B in FIG. 3, the detecting system modifies its conventional sequence and enters what is called a validation sequence. The transmitter and receiver antenna phasing conditions are locked to those present when the marker was first detected until either an alarm is generated or the marker is rejected. Under these conditions, it would be advantageous if adjacent systems within the limiting distance d1 of the first EAS system, for example EAS systems A and C in FIG. 3), could, after receiving a unique signaling frequency, adopt an equivalent pseudo-validation sequence. In this case, the transmitter fields produced by the adjacent EAS systems A and C can operate in concert with the first EAS system, and assist the first system in stimulating the marker. During this validation sequence, it is a common practice to cease transmission during what would normally be a transmitter window, in order to test whether the receiver is responding to a valid marker or an errant transmitter signal from a nearby EAS system. Advantageously, when a tag or marker enters the magnetic field of an EAS system, and the system modifies its normal sequence and enters a validation sequence, at some point during the validation sequence the system can transmit a second unique signaling frequency, which nearby EAS systems within limiting distance d1 of the first EAS system, would interpret as a request to cease transmission during the next transmitter window. In this way, the other EAS system would not erroneously transmit during a forced-transmit-off window, which would stimulate the marker and cause said first EAS system's validation sequence to fail.

There is no need for the second system to pass these is commands on to adjacent systems within limiting distance d1, since this cooperative behavior is only necessary locally to the first detecting system. Adjacent systems further than limiting distance d1 from the first detecting EAS system have fields which have no substantial effect on the detection of markers within the field of the first detecting EAS system, and so, have no need to operate cooperatively.

Figure 6:
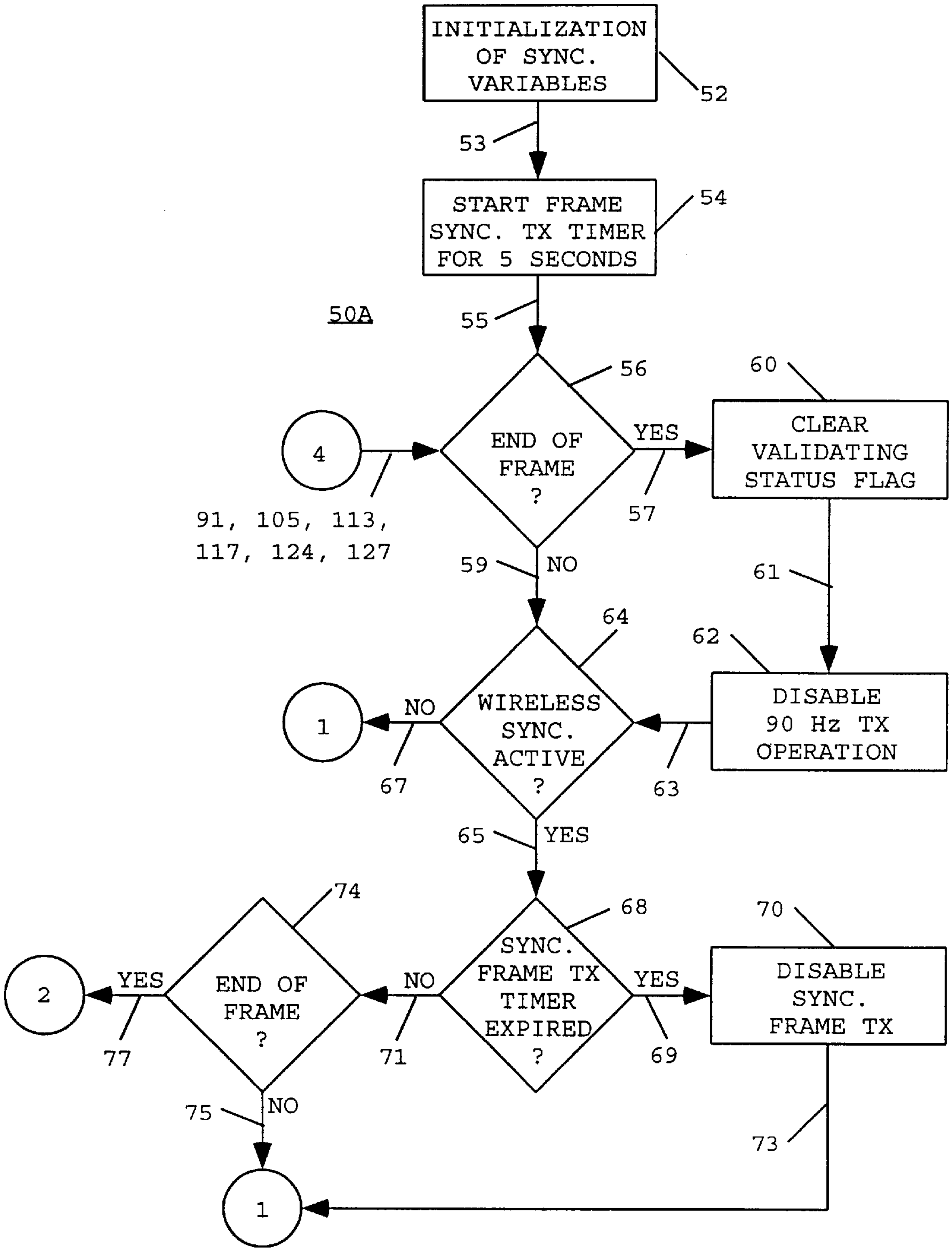
FIGS. 6, 7 and 8 are, taken together, a flow chart useful for explaining wireless synchronization of multiple EAS systems in accordance with the inventive arrangements.
Figure 7:
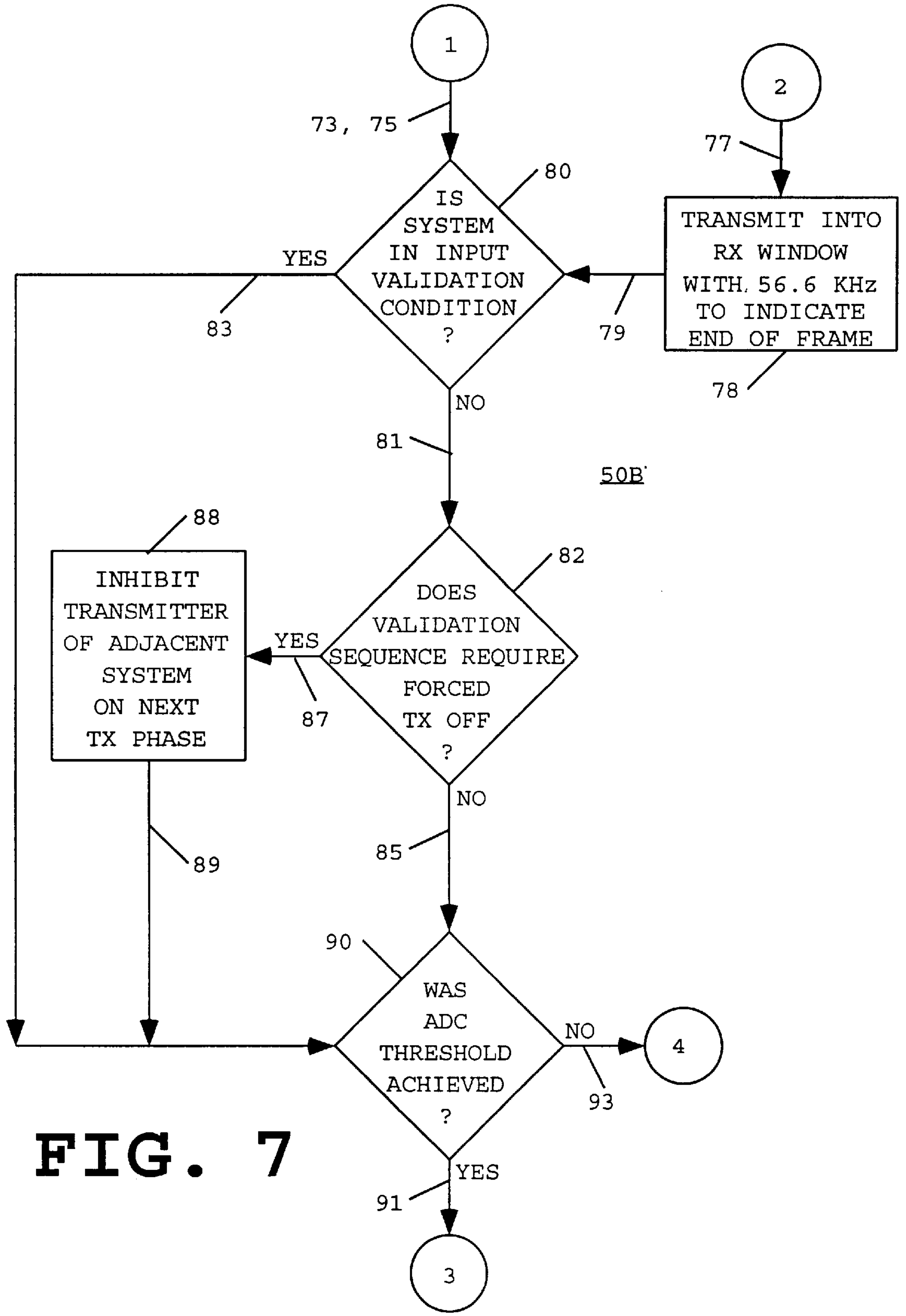

A flow chart useful for explaining wireless synchronization in accordance with the inventive arrangements is shown in FIGS. 6, 7 and 8. The different parts of the flow chart are designated by reference numerals 50A, 50B and 50C in FIGS. 6, 7 and 8 respectively. The circles in FIG. 6 with numeral 1 are branches to the circle in FIG. 7 with numeral 1. The circle in FIG. 6 with numeral 2 is a branch to the circle in FIG. 7 with numeral 2. The circle in FIG. 7 with numeral 3 is a branch to the circle in FIG. 8 with numeral 3. The circles in FIGS. 7 and 8 with numeral 4 are branches to the circle in FIG. 1 with numeral 4.

With reference to FIG. 6, the first step is the initialization of the synchronizing variables in block 52. Path 53 leads to block 54, in accordance with which the frame synchronizing transmitter (TX) timer is started for a 5 second interval. Path 55 leads to a decision block 56, which queries whether the end of a synchronizing frame has been reached.

If the answer to decision block 56 is Yes, the method branches on path 57 to block 60, in accordance with which the validating status flag is cleared. Path 62 leads to block 62, in accordance with which 90 Hz operation is disabled. If the answer to decision block 56 is No, the method branches on path 59 to decision block 64. Path 63 from block 62 also leads to decision block 64.

Decision block 64 queries whether wireless synchronization is active. If the answer is Yes, the method branches on path 65 to decision block 68. If the answer is No, the method branches on path 67 to decision block 80 in FIG. 7.

Decision block 68 queries whether the synchronizing frame transmitter timer, started in block 54, has expired. If the answer is Yes, the method branches on path 69 to block 70, in accordance with which the synchronizing frame transmitter is disabled. Thereafter, path 73 leads to decision block 80 in FIG. 7. If the answer is No, the method branches on path 71 to decision block 74.

Decision block 74 queries whether the end of the synchronizing frame has been reached. If the answer is No, the method branches on path 75 to decision block 80 in FIG. 7. If the answer is Yes, the method branches on path 77 to block 78 in FIG. 7. In accordance with block 78, the system transmits in the receiver (RX) window with a signal at 56.6 kHz to indicate the end of the synchronizing frame. Thereafter, path 79 lead to decision block 80.

Decision block 80 in FIG. 7 queries whether the system is in an input validation condition. If the answer is No, path 81 leads to decision block 82. Decision block 82 queries whether the validation sequence requires a forced transmitter off condition. If the answer is Yes, path 87 leads to block 88, in accordance with which the transmitter(s) of adjacent system(s) is or are inhibited on the next transmitter phase. Thereafter, path 89 leads to decision block 90. If the answer to decision block 82 is No, path 85 leads to decision block 90. If the answer to decision block 80 is Yes, path 83 leads to decision block 90.

Decision block 90 queries whether the analog to digital converter threshold value was achieved, corresponding to the second part of the validation sequence, the first part of the validation sequence being a signal having the correct frequency. If the answer is No, the method branches on path 93 to decision block 56 in FIG. 6. If the answer is Yes, the method branches on path 91 to decision block 92 in FIG. 8.

Decision block 92 queries whether a synchronizing frame command has been received. If the answer is No, the method branches on path 93 to decision block 96. If the answer is Yes, the method branches on path 95 to decision block 114, which queries whether a frame command has been received for this frame. If the answer is Yes, the method branches on path 117 to decision block 56 in FIG. 6. If the answer is No, the method branches on path 115 to block 118, in accordance with which the phase of No. 49 is changed. Path 119 then leads to block 120, in accordance with which the frame synchronizing transmitter timer is started for a 5 second interval. Thereafter, path 121 leads to decision block 56 in FIG. 6.

If the answer to decision block 96 is Yes, the method branches on path 99 to block 100, in accordance with which operation at 90 Hz is enabled. Path 101 then leads to block 102, in accordance with which a wireless in validation condition is indicated. Path 103 then leads to block 104, in accordance with which the antenna phase and frequency are locked. Thereafter, path 105 leads to decision block 56 in FIG. 6. If the answer to decision block 96 is No, the method branches on path 97 to decision block 106.

Decision block 106 queries whether a validation on command has been received. If the answer is Yes, the method branches on path 107 to block 110, in accordance with which operation at 90 Hz is disabled. Path 111 then leads to block 112, in accordance with which the wireless in validation condition is disabled, thereafter, path 113 leads to decision block 56 in FIG. 6.

If the answer to decision block 106 is No, the method branches on path 109 to decision block 122, which queries whether a transmitter off command has been received. If the answer is Yes, the method branches on path 123 to block 126, in accordance with which the transmitter is disabled on the next phase. If the answer is No, the method branches on path 125 to decision block 56 in FIG. 6.

Operating adjacent EAS systems in an unsynchronized manner reduces their respective performance. Operating adjacent EAS systems in a synchronized manner actually enhances their respective fields, providing better performance at no additional cost. In pulsed magnetic EAS systems, incorporating wireless synchronization in accordance with the inventive arrangements provides significant advantages in enabling cooperative control of many operating parameters of adjacent EAS systems, enhanced reliability and lower cost.

What is claimed is:

1. A method for wireless synchronization of first and second magnetic electronic article surveillance (EAS) systems arranged for operation in close proximity to one another, comprising the steps of:

programming each of said first and second EAS systems for transmitting using a respective marker interrogation transmitter at least one unique signal into respective and partially overlapping interrogation zones of said first and second EAS systems and for receiving any signal from said interrogation zones using a respective marker detection receiver at respective and predetermined transmit and receive phases relative to a common reference;

transmitting said at least one unique signal from said first EAS system using said marker interrogation transmitter of said first EAS system;

receiving said at least one unique signal at said second EAS system using said marker detection receiver of said second EAS system during one of said phases otherwise predetermined for receiving signals;

recognizing phase information conveyed by said at least one unique signal; and, transmitting using said marker interrogation transmitter from said second EAS system synchronously with said transmitting using said marker interrogation transmitter from said first EAS system, responsive to said conveyed phase information.

2. The method of claim 1, comprising the step of gradually reducing a phase delay between the at least one unique signal as detected and recognized and initiation of a normal receiver phase, until said at least one unique signal is just detected.

3. The method of claim 1, comprising the step of generating said at least one unique signal at a frequency known to force a response from a magnetic marker in any one of said interrogation zones.

4. The method of claim 1, comprising the step of conveying said phase information in said at least one unique signal by periodically interrupting said transmitting of said at least one unique signal.

5. The method of claim 1, comprising the step of conveying said phase information in said at least one unique signal by generating said at least one unique signal at a predetermined frequency.

6. The method of claim 5, comprising the step of identifying said at least one unique signal by correspondence with said predetermined frequency and by a minimum signal amplitude.

7. The method of claim 1, comprising the step of conveying phase information and conveying information representative of certain events occurring during operating said first EAS system by selectively generating one of a plurality of unique signals.

8. The method of claim 7, further comprising the step of modifying operation of said second EAS system responsive to said selectively generated and identified ones of said plurality of unique signals.

9. The method of claim 8, further comprising the step of temporarily inhibiting signal transmitting from said second EAS system during a marker validation sequence in said first EAS system.

10. The method of claim 8, further comprising the steps of:

testing said wireless synchronization of said first and second EAS systems after each instance of detecting a valid marker in any one of said interrogation zones; and, if said first and second EAS systems are found not to be synchronized by said testing, resynchronizing said first and second EAS systems.

11. The method of claim 10, further comprising the step of testing said wireless synchronization only during a predetermined receive phase.

12. A wireless arrangement of multiple magnetic electronic article surveillance (EAS) systems, comprising:

first and second magnetic EAS systems positioned for operation in such close proximity to one another that said first and second EAS systems have respective interrogation zones which partially overlap one another;

said first and second EAS systems having respective antenna assemblies;

said first and second EAS systems having respective marker interrogation transmitter circuits coupled to said respective antenna assemblies for generating at least one unique signal in said respective interrogation zones;

said first and second EAS systems having respective marker detection receiver circuits coupled to said antenna assemblies for capturing signals including said at least one unique signal from said respective interrogation zones;

said first and second EAS systems having respective controllers programmed with a common set of instructions for initiating and terminating transmission using said marker interrogation transmitter circuits of said at least one unique signal and for receiving any signal, including said at least one unique signal, using said marker detection receiver circuits from said respective interrogation zones at respective transmit and receive phases, determined by said instructions and relative to a common reference;

said controller in said first EAS system initiating transmission using said marker interrogation transmitter circuit of said first EAS system of said at least one unique signal from said first EAS system, said at least one unique signal conveying phase information; and, said controller in said second EAS system initiating reception using said marker detection receiver circuit of said second EAS system of signals from said respective interrogation zone during one of said receiver phases and in response to receiving and identifying said at least one unique signal transmitted by said first EAS system during said receiver phase, said controller in said second EAS system modifying operation of said second EAS system responsive to said phase information conveyed in said at least one unique signal to synchronize operation of said second EAS system with operation of said first EAS system.

13. The arrangement of claim 12, wherein said controller in said second EAS system gradually reduces a phase delay between the at least one unique signal as received and identified and initiates a normal receiver phase, until said at least one unique signal is just detected.

14. The arrangement of claim 12, wherein said at least one unique signal has a frequency known to force a response from a magnetic marker in any one of said interrogation zones.

15. The arrangement of claim 12, wherein a periodic interruption of said at least one unique signal conveys said phase information.

16. The arrangement of claim 12, wherein a predetermined frequency of said at least one unique signal conveys said phase information.

17. The arrangement of claim 16, wherein said controller identifies said at least one unique signal by correspondence with said predetermined frequency and by a minimum signal amplitude.

18. The arrangement of claim 12, wherein said controller initiates selective generation of one of a plurality of unique signals for conveying information representative of certain events occurring during operation of said first EAS system.

19. The arrangement of claim 18, wherein said controller in said second EAS system modifies operation of said second EAS system responsive to said selectively generated and identified ones of said plurality of unique signals.

20. The arrangement of claim 19, wherein said controller of said second EAS system temporarily inhibits signal transmitting from said second EAS system during a marker validation sequence in said first EAS system.

21. The arrangement of claim 19, wherein said respective controllers of said first and second EAS systems initiate testing of said wireless synchronization after each instance of detecting a valid marker in said respective interrogation zone.

22. The arrangement of claim 21, wherein said controller initiates said testing of said wireless synchronization only during a predetermined receive phase.

23. The arrangement of claim 22, wherein said controller resynchronizes said first and second EAS systems if said first and second EAS systems are found not to be synchronized by said testing.

* * * * *